US008801886B2

(12) United States Patent
Roberts et al.

(10) Patent No.: US 8,801,886 B2
(45) Date of Patent: Aug. 12, 2014

(54) CERAMIC COMPOSITE COMPONENTS AND METHODS OF FABRICATING THE SAME

(75) Inventors: Herbert Chidsey Roberts, Simpsonville, SC (US); Paul Stephen DiMascio, Greer, SC (US)

(73) Assignee: General Electric Company, Schenectady, NY (US)

( * ) Notice: Subject to any disclaimer, the term of this patent is extended or adjusted under 35 U.S.C. 154(b) by 513 days.

(21) Appl. No.: 12/761,932

(22) Filed: Apr. 16, 2010

(65) Prior Publication Data

US 2011/0256358 A1 Oct. 20, 2011

(51) Int. Cl.
*C03B 29/00* (2006.01)
*B29C 53/82* (2006.01)
*B29C 65/00* (2006.01)
*B32B 37/00* (2006.01)

(52) U.S. Cl.
USPC ......... 156/155; 156/89.11; 156/292; 156/293

(58) Field of Classification Search
USPC ......... 156/60, 70, 89.11, 89.23, 89.25, 89.26, 156/89.27, 153, 154, 155, 242, 245, 292, 156/293, 303.1, 325, 326, 327, 335
See application file for complete search history.

(56) References Cited

U.S. PATENT DOCUMENTS

| 4,648,921 | A | 3/1987 | Nutter, Jr. |
| 5,018,271 | A | 5/1991 | Bailey et al. |
| 5,292,231 | A | 3/1994 | Lauzeille |
| 5,403,153 | A | 4/1995 | Goetze |
| 6,024,898 | A | 2/2000 | Steibel et al. |
| 6,418,973 | B1 | 7/2002 | Cox et al. |
| 6,607,358 | B2 | 8/2003 | Finn et al. |
| 6,769,866 | B1 | 8/2004 | Kannefass et al. |
| 7,963,745 | B1 * | 6/2011 | Liang .......................... 416/97 R |
| 2002/0076541 | A1 * | 6/2002 | Jarmon et al. ............. 428/312.6 |
| 2003/0059577 | A1 * | 3/2003 | Morrison et al. ............. 428/166 |
| 2003/0129338 | A1 * | 7/2003 | Cairo ............................ 428/36.1 |
| 2004/0221941 | A1 * | 11/2004 | Bouillon et al. ............. 156/155 |
| 2005/0076504 | A1 | 4/2005 | Morrison et al. |

FOREIGN PATENT DOCUMENTS

| EP | 0545685 A1 | 6/1993 | |
| EP | 2052853 A2 * | 4/2009 | ............. B32B 18/00 |
| WO | 2008100306 A2 | 8/2008 | |

OTHER PUBLICATIONS

An International Search Report, dated May 30, 2011 for co-pending International Application No. PCT/US2011/030456 (11 pages).

* cited by examiner

*Primary Examiner* — Philip Tucker
*Assistant Examiner* — Brian R Slawski
(74) *Attorney, Agent, or Firm* — Armstrong Teasdale LLP

(57) ABSTRACT

A method for fabricating a ceramic composite includes forming a first ceramic composite layer (CCL), positioning a form against the first CCL, positioning a second CCL against the form such that the form is at least partially circumscribed by the first CCL and the second CCL. The method also includes coupling the first CCL to the second CCL, such that at least a first passage extends in a first direction across at least a portion of the ceramic composite component and is defined at least partially by the first CCL and the second CCL in a location vacated by the first form.

15 Claims, 3 Drawing Sheets

CERAMIC COMPOSITE COMPONENTS AND METHODS OF FABRICATING THE SAME

BACKGROUND OF THE INVENTION

The field of the invention relates generally to the manufacture of composite components and more particularly, to ceramic composite components and methods of fabricating the same.

Because of the heat and temperature resistivity of ceramic materials, components fabricated from ceramic materials are often used in lieu of components fabricated from other materials, such as metal components. Often, ceramic components are fabricated with a hollow cavity or flow passage defined therein that enables cooling fluid to be channeled through the components to facilitate cooling, or other transfer of energy, to the components and/or components downstream from the ceramic components. For example, at least some known gas turbine engines include components that may be at least partially manufactured from a composite material. Such turbine components may be at least partially cooled by a film of cooling air discharged from a cavity defined in the component.

At least one known method of fabricating ceramic components involves a casting process in which multiple cooling slots are formed in the components in a plurality of substantially parallel rows. For example, in known components, each of the slots created in the component is formed with one or more lengths when the component is fabricated using a lost wax or investment casting process. During such a casting process, an insert is used to create the component. While such a process is commonly used with non-ceramic components, manufacturing ceramic components with such a casting process may be difficult, time-consuming, and expensive.

Another known method of fabricating composite components is a layering method of fabrication. In such a method, several layers of ceramic materials may be coupled together such that passages may be later formed using a drill or other forms of energy to systematically remove existing material. However, because of the strength of the materials used in fabricating such components, drill bits, or other forms of energy transfer devices and systems, may prematurely wear out, thus increasing the cost of fabrication. Moreover, in such a fabrication process, the orientation of each passage is limited because of the inherent limitations of known drill bits or other energy transfer devices and systems.

BRIEF DESCRIPTION OF THE INVENTION

In one aspect, a method for fabricating a ceramic composite component is provided. The method includes forming a first ceramic composite layer (CCL), positioning a form against the first CCL, positioning a second CCL against the form such that the form is at least partially circumscribed by the first CCL and the second CCL. The method also includes coupling the first CCL to the second CCL, such that at least a first passage extends in a first direction across at least a portion of the ceramic composite component and is defined at least partially by the first CCL and the second CCL in a location vacated by the first form.

In another aspect, a method for fabricating a ceramic composite component is provided. The method includes forming a first ceramic composite layer (CCL), positioning a first form against the first CCL, positioning at least a second CCL against a first side of the first form such that the first form is at least partially circumscribed by the first CCL and the at least a second CCL. The method also includes coupling the first and second CCLs together, such that at least a first passage extending in a first direction across at least a portion of the ceramic composite component is defined in a location vacated by the first form.

In still another aspect, a ceramic composite component is provided. The ceramic composite component includes a body extending from an upper surface to a lower surface, said body comprising at least two ceramic composite layers (CCLs). The component also includes a first CCL, a second CCL, wherein the second CCL is bonded to the first CCL, a first passage extending in a first direction across at least a portion of the ceramic composite component a second passage extending perpendicular from the first passage, such that the second passage does not extend to an edge of said body.

DETAILED DESCRIPTION OF THE INVENTION

Figure 1:
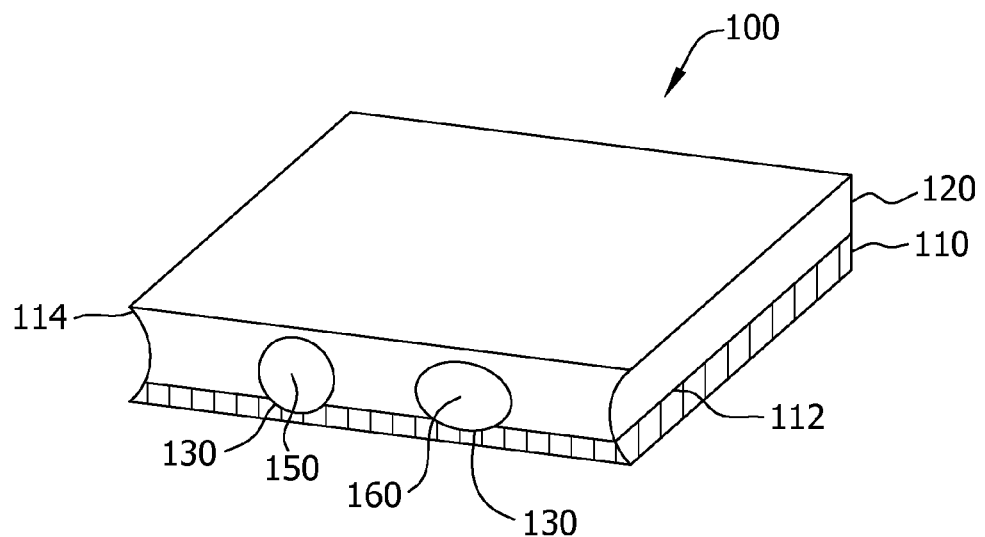
FIG. 1 is a perspective view of an exemplary ceramic composite component, in its initial phase of fabrication, and that is being fabricated with only two layers.

FIG. 1 is a perspective view of an exemplary ceramic composite component 100, in its initial phase of fabrication. In the exemplary embodiment, component 100 is formed via processing techniques such as those disclosed in U.S. Pat. No. 6,024,898, for example. More specifically, in the exemplary embodiment, ceramic component 100 is formed with a first ceramic composite layer (CCL) 110, and a second CCL 120, using a form system 130. In the exemplary embodiment, form system 130 is hollow and includes passage segments 150 and 160 and is hollow. Alternatively, all or at least a portion of form system 130 can be solid.

More specifically, in the exemplary embodiment, each segment 150 and 160 has a respective substantially circular cross-sectional shape and a substantially elliptical cross-sectional shape. Alternatively, each segment 150 and/or 160 may have any cross-sectional shape that enables component 100 to function as described herein. Moreover, in the exemplary embodiment, each passage segment 150 and 160 extends inward from at least one outer edge 114 of CCL 110 and 120. Alternatively, at least one end of passage segments 150 and/or 160 terminates a distance inwardly from an outer edge 114 of layer 110 and 120 and is substantially sealed by layers 110 and 120.

Initially, in the exemplary embodiment, first CCL 110 is positioned on a substantially planar surface and form system 130 is positioned against an upper surface 112 of first CCL 110. Specifically, form system 130 is positioned in a location relative to CCL 110 that enables passages (not shown in FIG. 1) to be formed in desired locations within component 100. After form system 130 is aligned in a desired orientation, a second CCL 120 is extended across first CCL 110 and form system 130, such that form system 130 is substantially sandwiched between, and circumscribed by, layers 110 and 120. Component 100 is then heat-treated to securely bind layers 110 and 120 together. In the exemplary embodiment, layers 110 and 120 each include a binder that facilitates enhancing the adhesion between layers 110 and 120. For example, the binder may be, but is not limited to being a phenolic resin or anamyl acetate compound. Additionally, in the exemplary embodiment, form system 130 is fabricated from a non-ceramic material, such as, but not limited to wood, plastic, or a compound of ceramic and non-ceramic materials. In one embodiment, the use of a compound of ceramic and non-ceramic materials may be used to add surface features, including but not limited to, fins and swirlers to a passage that facilitates transferring energy along the passage or through the surface wall. Alternatively, form system 130 may be fabricated from any material that enables system 130 to function as described herein. During the heat-treating process, the binder and form system 130 are each melted and dissolved from component 100, such that a plurality of passages (not shown in FIG. 1) are defined in those locations vacated by passage segments 150 and 160.

Figure 2:
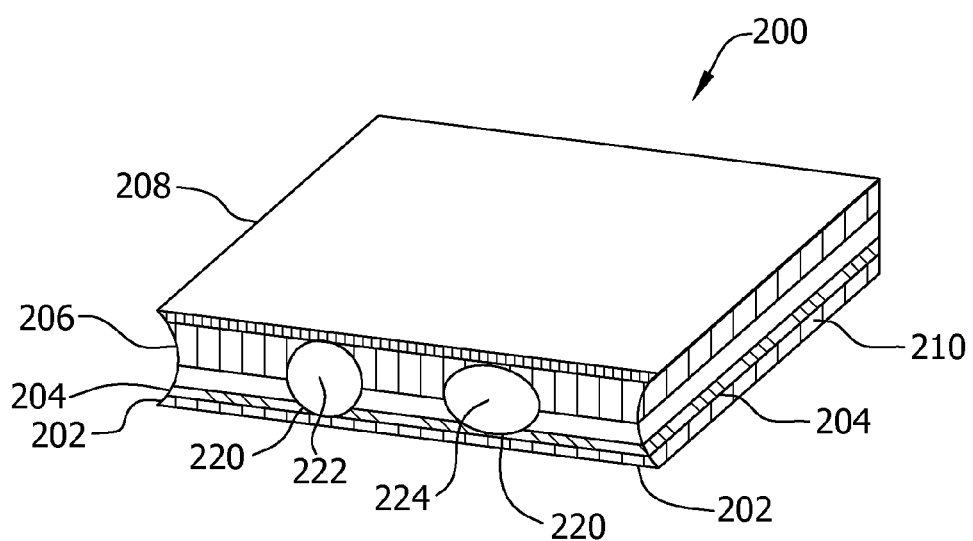
FIG. 2 is a perspective view of an alternative embodiment of a ceramic composite component, in its initial phase of fabrication, and that is being fabricated with more than two layers.

FIG. 2 is a perspective view of an exemplary ceramic composite component 200, in its initial phase of fabrication. In the exemplary embodiment, component 200 is formed with a first ceramic composite layer (CCL) 202, a second CCL 204, a third CCL 206, and an upper CCL 208, and uses a form system 220 during the fabrication process. More specifically, in the example embodiment, form system 220 includes two hollow passage segments 222 and 224. Alternatively, at least a portion of form system 220, including segment 222 and/or segment 224, can be solid. Initially, in the exemplary embodiment, first CCL 202 is positioned on a substantially planar surface, and hollow form system 220 is positioned against an upper surface 210 of first CCL 202 in a location that enables passages (not shown in FIG. 2) to be formed in desired locations within component 200. A second CCL 204 is extended across first CCL 202, such that hollow form system 220 is at least partially encapsulated between first CCL 202 and second CCL 204. A third CCL 206 is then extended across second CCL 204 such that form system 220 is substantially encapsulated by CCLs 202, 204, and 206. An upper CCL 208 is then extended across third CCL 206.

When CCLs 202, 204, 206, and 208 are each arranged and aligned in their desired orientations, ceramic component 200 is heat-treated to securely bind layers 202, 204, 206, and 208 together using a binder that facilitates enhancing the adhesion between layers 202, 204, 206, and 208. Moreover, during the heat-treatment, the binder and form system 220 are each melted such that a plurality of passages are defined in locations previously occupied by passage segments 222 and 224. In the exemplary embodiment, passage segments 222 and/or 224 have a respective substantially circular cross-sectional shape and a substantially elliptical cross-sectional shape. Alternatively, each segment 222 and/or 224 may have any cross-sectional shape that enables component 200 to function as described herein.

Figure 3:
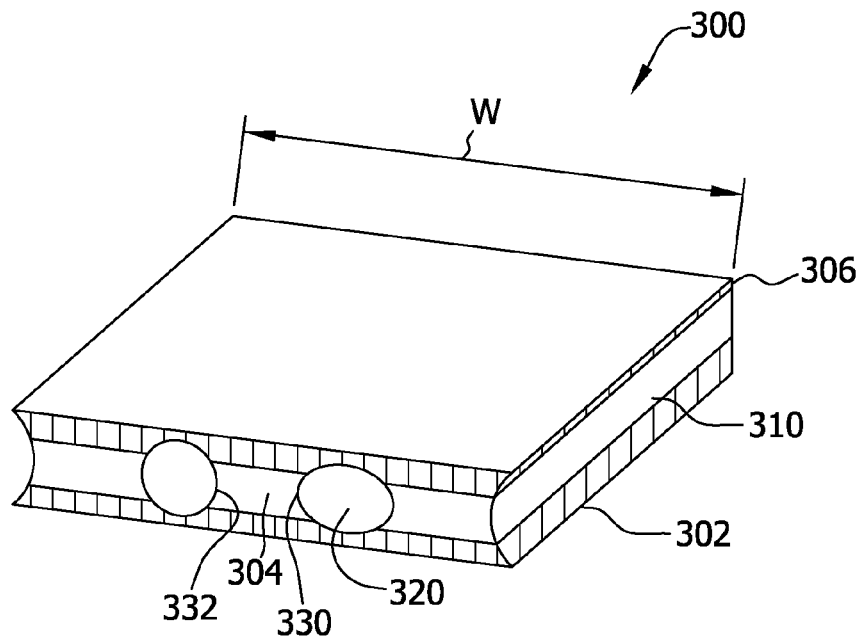
FIG. 3 is a perspective view of a further alternative embodiment of a ceramic composite component, in its initial phase of fabrication, and that is being fabricated with more than two layers.

FIG. 3 is a perspective view of an exemplary ceramic composite component 300, in its initial phase of fabrication. In the exemplary embodiment, component 300 is formed from a plurality of layers 302, 304, and 306, and uses a form system 320 during the fabrication process. In the exemplary embodiment, form system 320 is hollow. Alternatively, any or all of form system 320 can be solid. Moreover, in the exemplary embodiment, a first ceramic composite layer (CCL) 302 is initially positioned on a substantially planar surface, and form system 320 is positioned against an upper surface 310 of first CCL 302. Moreover, in the exemplary embodiment, form system 320 includes at least a first passage segment 330 and a second passage segment 332. A second CCL 304 is positioned to extend between segments 330 and 332 such that passage segments 330 and 332 are partially circumscribed by CCL 304. An upper layer 306 is then positioned across first CCL 302 and second CCL 304 such that, in the exemplary embodiment, upper layer 306 extends across a full width W of component 300. When layers 302, 304, and 306 are arranged and aligned in their desired orientation, ceramic component 300 is heat-treated to securely bind layers 302, 304, and 306, together, such that form system 320 is melted to produce a plurality of passages (not shown in FIG. 3) in the locations within component 300 that were vacated by form system 320. In an alternative embodiment, a plurality of layers of ceramic composite material could be positioned between segments 330 and 332.

It should be noted that ceramic components, such as components 100, 200, and/or 300, can be fabricated with any number of layers of ceramic composite materials and/or with the layers of ceramic composite materials oriented in any orientation that enables the resulting ceramic components to function as described herein. Moreover, ceramic components, such as components 100, 200, and/or 300, can be fabricated with any number of passages oriented in any direction(s) that enables the resulting ceramic components to function as described herein. A benefit of adding multiple layers, such as layer 304, to a specified region or regions during the fabrication process, is that the resulting ceramic components provided can be provided with extra weight or strength in specified regions.

Figure 4:
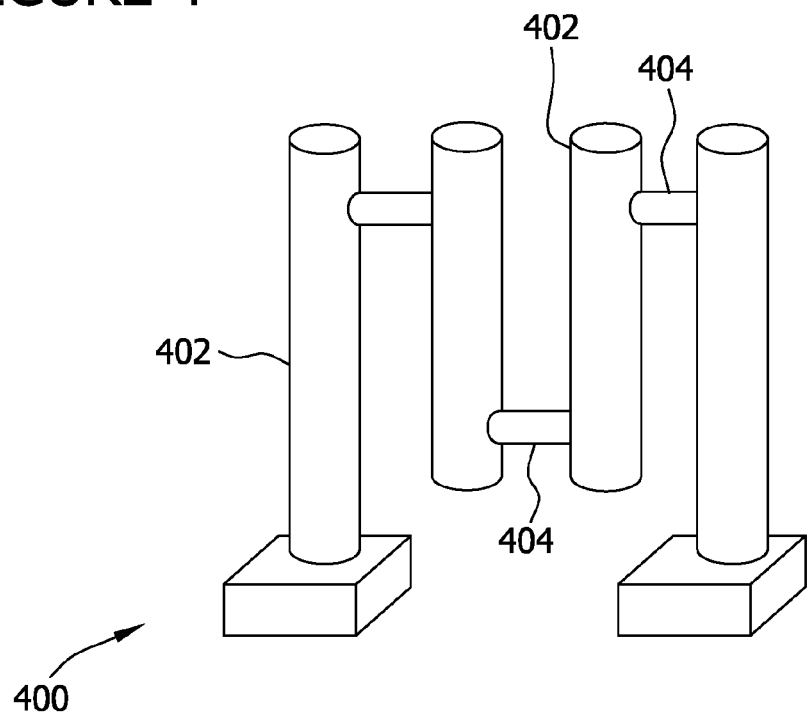
FIG. 4 is a perspective view of an exemplary hollow form that may be used in fabricating a composite component, such as the components shown in FIGS. 1-3.

FIG. 4 is a perspective view of an exemplary form system 400 that can be used in fabricating ceramic components, such as components 100, 200, and/or 300 (shown in FIGS. 1, 2, and 3). In the exemplary embodiment, form system 400 includes a plurality of hollow passage segments 402 that are oriented generally parallel to each other and that are coupled together in flow communication by a plurality of hollow connecting segments 404. More specifically, in the exemplary embodiment, segments 404 extend generally perpendicularly between adjacent passage segments 402 to enable passages created by segments 402 to be coupled together in flow communication.

Figure 5:
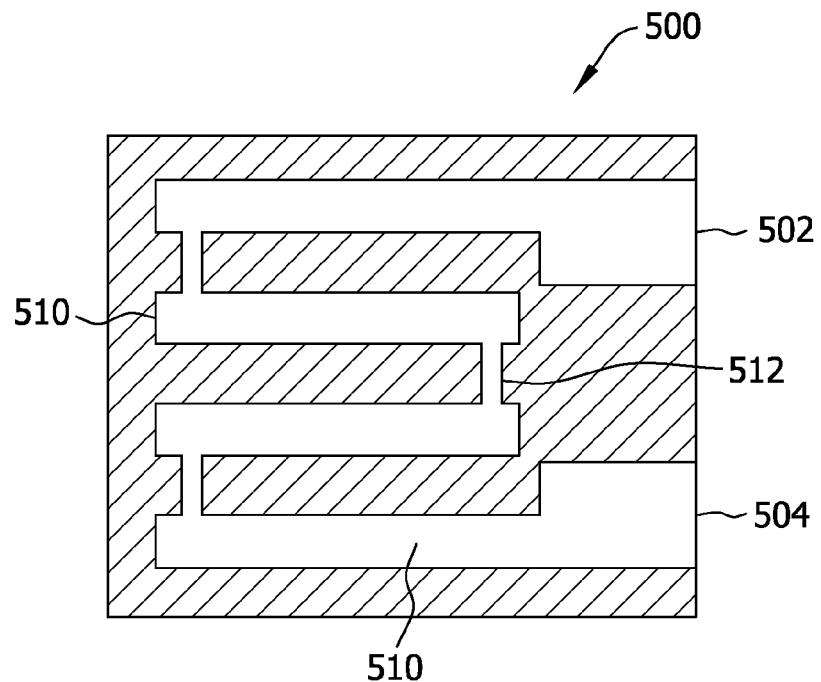
FIG. 5 is a cross-sectional view of an exemplary ceramic composite component that includes a plurality of internal passages that are coupled together in flow communication.

FIG. 5 is a cross-sectional view of an exemplary ceramic composite component 500 that could be formed using the fabrication methods described herein. In the exemplary embodiment, component 500 includes a first aperture 502, a second aperture 504, a plurality of passages 510 oriented in a first direction, and a plurality of passages 512 oriented in a second direction that is substantially perpendicular to passages 510.

Figure 6:
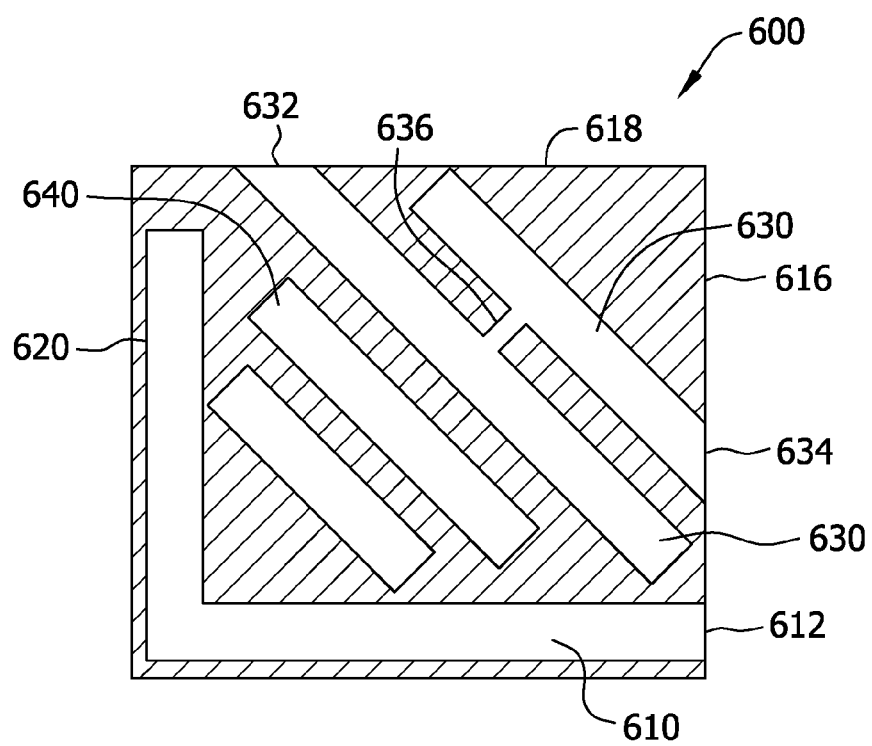
FIG. 6 is a cross-sectional view of an alternative ceramic composite component that includes a plurality of internal passages extending in a plurality of different orientations.

FIG. 6 is a cross-sectional view of an alternative ceramic composite component 600 that could be formed using the fabrication methods described herein. Similarly, ceramic component 600 includes a first passage 610, a second passage 620, and passages 630 and 640 that are oriented obliquely with respect to passages 610 and 620. In the exemplary embodiment, passage 610 extends to edge 616 and includes an aperture 612. Passage 620 is in flow communication with is substantially perpendicular to passage 610. Moreover, passage 620 does not extend to an outer edge 618 of component 600. Obliquely-oriented passages 630 include apertures 632 and 634 that enable flow communication through passages 630. Passages 630 also include a passage 636 that extends between passages 630 to enable flow communication between apertures 632 and 634. Passages 640 are formed such that they are sealed within component 600.

A benefit of fabricating a ceramic component, such as component 600 (shown in FIG. 6), using form system 400, is that passages, such as 610 and 620, may be formed to enable bi-directional flow communication throughout the ceramic component while only having one aperture, such as aperture 612. In contrast, known systems of fabricating ceramic composite components, such as layering methods, cannot produce passages that enable bi-directional flow communication without including apertures for each passage because of fabrication limitations inherent with forming passages using drills. More specifically, when using a drill, or other forms of energy to systematically remove existing material to create flow passages, connecting passages must each extend from the edge of a component to a passage. As such, another advantage of using form system 400 is the elimination of the requirement to form passages in a composite component using a drill or other forms of energy.

Another benefit of using form system 400 when fabricating a ceramic component is that form system 400 enables air, fluid, or gas to enter and exit through first aperture and continue to flow through the entire component allowing for heating or cooling of the component and exit a second aperture (as shown in FIGS. 5 and 6). Another benefit of using form system 400 when fabricating a ceramic component is that form system 400 enables the insertion of solid or foam materials in the flow passages. Additionally, another benefit of using form system 400 when fabricating a ceramic component is that form system 400 can include curved segments to produce curved flow passages (not shown) within a ceramic component.

Yet, another benefit of fabricating a ceramic component using form system 400 is that flow passages can be created that are sealed in a component, such as passages 640 (shown in FIG. 6). A benefit of using sealed passages is that structural support can be easily added to a component as a rib could be inserted into the passages of the component. Additionally, it could be seen by one skilled in the art that sealed flow passages could be used as a heat pipe, or other means of energy transfer, as they are sealed in the component.

The above-described methods and apparatus provide a cost-effective and highly reliable method for fabricating a ceramic composite component with internal passages. The fabrication process described herein provides a cost effective method of fabricating ceramic composite components that enable internal cooling passages formed in a manner that does not sacrifice the structural integrity of the component. In addition, the internal passages, in one embodiment facilitate reducing the weight of the component, facilitate reducing vibration, and provide an area in which ribs may be inserted to enhance the structural strength of the component. The fabrication also provides thermal growth benefits due to its structure.

Exemplary embodiments of an apparatus and method for fabricating a ceramic composite component are described above in detail. The apparatus and fabrication methods are not limited to the specific embodiments described herein. For example, the fabrication methods need not be limited to practice with only ceramic composite components. Rather, the present invention can be implemented and utilized in connection with many other high temperature component applications.

While the invention has been described in terms of various specific embodiments, those skilled in the art will recognize that the invention can be practiced with modification within the spirit and scope of the claims.

What is claimed is:

1. A method for fabricating a ceramic composite component, said method comprising:
   forming a first ceramic composite layer (CCL);
   positioning a first form against the first CCL;
   positioning a second form against the first CCL;
   positioning a second CCL against a first side of the first form, such that the first form is at least partially circumscribed by the first and second CCLs and the second form is encased by the first and second CCLs, wherein the first and second CCL CCLs are positioned such that first sides of the first and second CCLs form a shape that is substantially complementary to a shape of the first and second forms, and such that second opposing sides of the first and second CCLs define exterior surfaces of the component; positioning at least a third CCL against the first form, such that the third CCL extends across the component from the first side of the first form to an opposite side of the first form; and
   coupling the first CCL to the second CCL, such that at least a first passage extending in a first direction across at least a portion of the ceramic composite component is defined at least partially by the first CCL and the second CCL in a location vacated by the first form, and a second passage is defined by the first CCL and the second CCL in a location vacated by the second form such that the second passage is sealed within the component and is defined entirely within the component.

2. A method in accordance with claim 1 further comprising:
   positioning at least a third form against the first form and the first CCL; and
   coupling the first CCL to the second CCL such that a third passage extending in a second direction and coupled in flow communication to the first passage, is defined at least partially by the first CCL and the second CCL in a location vacated by the third form.

3. A method in accordance with claim 1 wherein forming a first CCL further comprises forming a first CCL that includes a binder.

4. A method in accordance with claim 1 wherein positioning a first form further comprises positioning a form fabricated from a non-ceramic, or partial non-ceramic, composite material against the first CCL.

5. A method in accordance with claim 2 wherein coupling the first CCL to the second CCL further comprises coupling the first CCL to the second CCL such that the first passage extends obliquely from the third passage.

6. A method in accordance with claim 1 further comprising heat curing the component being fabricated to cause at least the first CCL to bond to at least the second CCL.

7. A method in accordance with claim 1 wherein coupling the first CCL to the second CCL further comprises coupling the first CCL to the second CCL such that a third passage is formed with surface features that include at least one of fins and swirlers that facilitate the transfer of energy.

8. A method for fabricating a ceramic composite component, said method comprising:
   forming a first ceramic composite layer (CCL);
   positioning at least a first form against the first CCL;
   positioning at least a second CCL against a first side of the first form and at least partially across the component, such that the first form is at least partially circumscribed by the first CCL and the at least a second CCL, wherein the first and second CCLs are positioned such that first sides of the first and second CCLs form a shape that is substantially complementary to a shape of the first form, and such that second opposing sides of the first and second CCLs define exterior surfaces of the component;
positioning at least a third CCL against the first form, such that the third CCL extends across the component from the first side of the first form to an opposite side of the first form;
coupling the first and second CCLs together, such that at least a first passage extending in a first direction across at least a portion of the ceramic composite component is defined in a location vacated by the first form; and
inserting a structural support into the first passage to facilitate enhancing the structural strength of the component.

9. A method in accordance with claim 8 further comprising positioning at least a second form against at least the first form and the first CCL, such that at least the second form is oriented substantially perpendicularly to at least the first form.

10. A method in accordance with claim 9 wherein coupling the first and second CCLs together further comprises coupling the CCL layers together such that a second passage extending in a second direction across at least a portion of the ceramic composite component is defined at least partially by the first and second CCLs, in a location vacated by the second form, and such that the first and second passages are coupled together in flow communication within the component, the first passage and the second passage forming a combined passage having only one aperture formed in an outer edge of the component.

11. A method in accordance with claim 8 wherein positioning at least a first form against the first CCL further comprises positioning at least the first form against the first CCL, such that the first form extends inwardly into the component from at least one outer edge of the component.

12. A method in accordance with claim 8 wherein positioning at least a form against the first CCL further comprises positioning at least a form fabricated from a non-ceramic composite material against the first CCL.

13. A method in accordance with claim 8 further comprising positioning at least a second form against at least the first form and the first CCL, such that at least the first passage extends obliquely from at least a second passage defined at least partially by the first and second CCLs in a location vacated by the second form.

14. A method in accordance with claim 8 further comprising heat curing the component to cause the CCL layers to bond together.

15. A method in accordance with claim 1, wherein positioning a first form further comprises positioning a curved form against the first CCL, wherein the first form is curved such that the first passage extends arcuately across at least a portion of the ceramic composite component.

* * * * *

UNITED STATES PATENT AND TRADEMARK OFFICE
CERTIFICATE OF CORRECTION

PATENT NO.         : 8,801,886 B2                                           Page 1 of 1
APPLICATION NO.    : 12/761932
DATED              : August 12, 2014
INVENTOR(S)        : Roberts et al.

It is certified that error appears in the above-identified patent and that said Letters Patent is hereby corrected as shown below:

In Claim 1, column 6, line 13, delete "second CCL CCLs are" and insert therefor -- second CCLs are --.

Signed and Sealed this
Second Day of February, 2016

Michelle K. Lee
*Director of the United States Patent and Trademark Office*